United States Patent
Mohapatra et al.

(10) Patent No.: US 8,274,977 B2
(45) Date of Patent: Sep. 25, 2012

(54) DISTRIBUTING PACKETS TO LINE CARDS OF A PACKET SWITCHING DEVICE BASED ON BRIDGE INDICATION VALUES RECEIVED THEREWITH

(75) Inventors: Pradosh Mohapatra, Fremont, CA (US); Clarence Filsfils, Brussels (BE); John H. W. Bettink, San Jose, CA (US); Sami Boutros, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 12/830,277

(22) Filed: Jul. 2, 2010

(65) Prior Publication Data

US 2012/0002673 A1 Jan. 5, 2012

(51) Int. Cl.
*H04L 12/28* (2006.01)
(52) U.S. Cl. .................. 370/389; 370/392; 370/401
(58) Field of Classification Search .............. None
See application file for complete search history.

(56) References Cited

U.S. PATENT DOCUMENTS

| | | | |
|---|---|---|---|
| 7,079,544 B2 | 7/2006 | Wakayama et al. | |
| 7,092,389 B2 | 8/2006 | Chase et al. | |
| 7,180,899 B2 | 2/2007 | De Silva et al. | |
| 7,499,456 B2 | 3/2009 | De Silva et al. | |
| 8,116,310 B2 | 2/2012 | Boers et al. | |
| 8,134,922 B2 | 3/2012 | Elangovan et al. | |
| 2002/0089992 A1 | 7/2002 | Yip et al. | |
| 2003/0002505 A1* | 1/2003 | Hoch et al. | 370/392 |
| 2003/0152075 A1 | 8/2003 | Hawthorne, III et al. | |
| 2005/0018605 A1 | 1/2005 | Foot et al. | |
| 2007/0110078 A1* | 5/2007 | De Silva et al. | 370/395.53 |
| 2007/0127376 A1 | 6/2007 | Chao et al. | |
| 2007/0258446 A1 | 11/2007 | Smith et al. | |

* cited by examiner

*Primary Examiner* — Duc C Ho
(74) *Attorney, Agent, or Firm* — The Law Offices of Kirk D. Williams

(57) ABSTRACT

A packet switching device maintains mappings of bridge identification values to line cards for each of multiple virtual bridges. When a packet is received that includes a bridge identification value, corresponding line card(s) are identified, with each being forwarded the packet. Each of these identified line cards, in response to receipt of the packet from the line card, determines whether to forward or drop the packet based on its maintained bridge table. In this manner, the original receiving line card does not need to maintain forwarding information based on destination addresses of received packets (e.g., does not need to maintain a bridge table for each virtual bridge), but rather forwards a packet to other line cards associated with the virtual bridge corresponding to the bridge identification value received in a packet.

25 Claims, 5 Drawing Sheets

US 8,274,977 B2

DISTRIBUTING PACKETS TO LINE CARDS OF A PACKET SWITCHING DEVICE BASED ON BRIDGE INDICATION VALUES RECEIVED THEREWITH

TECHNICAL FIELD

The present disclosure relates generally to packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Certain packet switching devices can be configured to implement multiple virtual bridges for selectively switching packet traffic within virtual private networks. Note, the term "virtual" is used to denote the sharing of physical hardware to implement multiple bridges, in contrast to each bridge being a standalone appliance. Further, Multiprotocol Label Switching (MPLS) is typically used within a service provider's core network to communicate packet traffic, including that of virtual private networks, with edge routers configured to terminate MPLS traffic, and send corresponding native packet traffic onto customers' networks.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
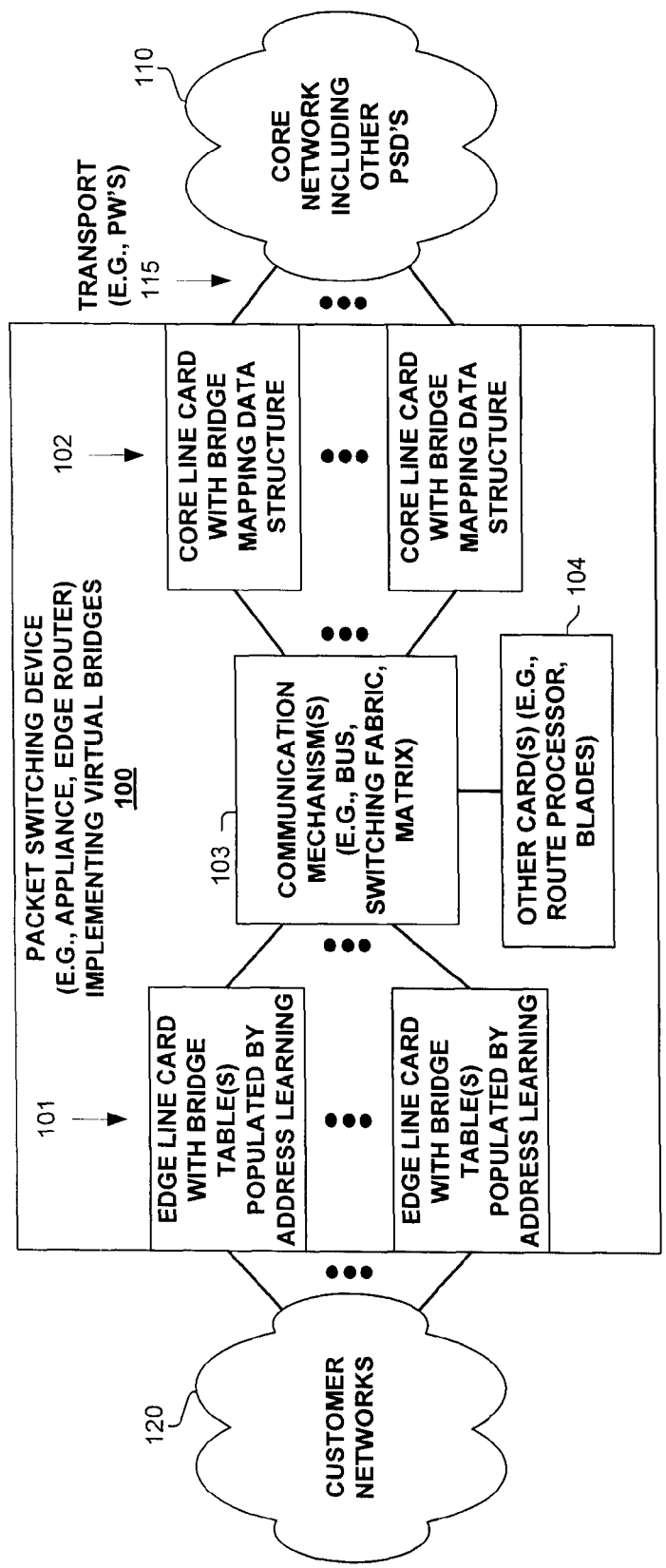
FIG. 1 illustrates a network operating according to one embodiment.

Disclosed are, inter alia, methods, apparatus, computer-storage media, mechanisms, and means associated with distributing packets to line cards of a packet switching device based on bridge indication values received therewith. One embodiment includes a packet switching device, comprising: a plurality of first line cards; a second line card, communicatively coupled to the plurality of first line cards, with the second line card configured: to receive a particular packet including one or more values identifying the bridge identification value, wherein the bridge identification value corresponds to a particular virtual bridge of a plurality of virtual bridges; to identify the plurality of first line cards based on said identified bridge identification value; and to forward said received particular packet, or derivation therefrom, to said identified plurality of first line cards; wherein the packet switching device is configured such that only a single one of said identified plurality of first line cards will send a packet from the packet switching device corresponding to said received particular packet.

In one embodiment, said received particular packet and said sent packet are both unicast packets. In one embodiment, the second line card does not include a bridge table. In one embodiment, said received particular packet includes one or more values identifying a transport source value identifying a transport source of said received particular packet; and wherein each of the plurality of first line cards is configured to perform address learning for populating respective one or more bridge tables, with said populating including for at least said single one of the plurality of first line cards: associating the transport source value with a source address of the particular packet. In one embodiment, each of the plurality of first line cards is configured to determine whether or not to send the packet corresponding to said received particular packet from the packet switching device based on a lookup operation in said respective one or more bridge tables. In one embodiment, the second line card is configured to store one or more data structures mapping the bridge identification value to the plurality of first line cards; and wherein said identifying the plurality of first line cards based on said identified bridge identification value includes performing a lookup operation on said one or more data structures.

2. Description

Disclosed are, inter alia, methods, apparatus, computer-storage media, mechanisms, and means associated with distributing packets to line cards of a packet switching device based on bridge indication values received therewith. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with distributing packets to line cards of a packet switching device based on bridge indication values received therewith. One embodiment includes a packet switching device, comprising: a plurality of first line cards; a second line card, communicatively coupled to the plurality of first line cards, with the second line card configured: to receive a particular packet including one or more values identifying the bridge identification value, wherein the bridge identification value corresponds to a particular virtual bridge of a plurality of virtual bridges; to identify the plurality of first line cards based on said identified bridge identification value; and to forward said received particular packet, or derivation therefrom, to said identified plurality of first line cards; wherein the packet switching device is configured such that only a single one of said identified plurality of first line cards will send a packet from the packet switching device corresponding to said received particular packet.

In one embodiment, said received particular packet and said sent packet are both unicast packets. In one embodiment, the second line card does not include a bridge table.

In one embodiment, said received particular packet includes one or more values identifying a transport source value identifying a transport source of said received particular packet; and wherein each of the plurality of first line cards is configured to perform address learning for populating respective one or more bridge tables, with said populating including for at least said single one of the plurality of first line cards: associating the transport source value with a source address of the particular packet. In one embodiment, each of the plurality of first line cards is configured to determine whether or not to send the packet corresponding to said received particular packet from the packet switching device based on a lookup operation in said respective one or more bridge tables. In one embodiment, the second line card is configured to store one or more data structures mapping the bridge identification value to the plurality of first line cards; and wherein said identifying the plurality of first line cards based on said identified bridge identification value includes performing a lookup operation on said one or more data structures.

One embodiment includes a method, comprising: receiving a particular packet on a first line card of a plurality of line cards of a packet switching device, with said received particular packet including: one or more values identifying a particular bridge value of a plurality of bridge values; forwarding said received particular packet, or a derivation therefrom, from the first line card to at least two of the plurality of line cards to which the particular bridge value is mapped; and sending, from the packet switching device, a packet corresponding to said received particular packet only from a single line card of said at least two of the plurality of line cards.

In one embodiment, the bridge identification value corresponds to a particular virtual bridge of a plurality of virtual bridges. One embodiment comprises: maintaining one or more data structures mapping each bridge identification value of the plurality of bridge identification values respectively to two or more of the plurality of line cards of the packet switching device. In one embodiment, said packet sent from the packet switching device does not include a representation of the particular bridge value. In one embodiment, said received particular packet and said sent packet are both unicast packets.

In one embodiment, said received particular packet includes one or more particular values identifying a particular transport source value identifying a transport source of said received particular packet; wherein each of said at least two of the plurality of line cards is configured to perform address learning for populating respective one or more bridge tables, with said populating including for at least said single line card: associating the transport source value with a source address of said received particular packet. In one embodiment, said one or more values identifying the particular transport source value and said one or more particular values identifying the particular bridge value include one or more Multiprotocol Label Switching (MPLS) labels. In one embodiment, said one or more MPLS labels include: a first MPLS label representing the particular bridge value, and a second MPLS label representing the particular transport source value. In one embodiment, the particular transport source value identifies a particular pseudowire over which packets can be received by the packet switching device. One embodiment comprises: advertising to another packet switching device to include the first MPLS label and the second MPLS label in packets being sent, over the particular pseudowire, to a particular virtual bridge corresponding to the particular bridge value. One embodiment comprises: performing, by each of said at least two of the plurality of line cards, address learning to build a respective bridge table for use in forwarding packets, wherein said address learning includes associating the particular transport source value with a source address of said received particular packet. In one embodiment, the first line card is not configured to perform address learning for the particular packet, or the derivation therefrom.

One embodiment comprises: performing, by each of said at least two of the plurality of line cards: learning to build a respective bridge table; and performing a lookup operation on a destination address of said received particular packet in the respective bridge table to determine whether to send said packet corresponding to said received particular packet or to drop the particular packet, or the derivation therefrom. In one embodiment, the first line card is not configured to perform address learning for the particular packet, or the derivation therefrom.

One embodiment includes a packet switching device, comprising: a plurality of edge line cards; a core line card, communicatively coupled to the plurality of edge line cards, with the core line card configured: to receive a Multiprotocol Label Switching (MPLS) packet including: a first label identifying a bridge identification value, and a second label identifying a transport source value; wherein the MPLS packet encapsulates a particular packet; to determine the plurality of edge line cards based on the bridge identification value; and to forward the particular packet and the transport source value to said determined plurality of edge line cards; and wherein each of the plurality of edge line cards is configured: to perform address learning for a respective one or more bridge tables, which includes associating the transport source value with a source address of the particular packet; and to perform lookup operations on the respective one or more bridge tables for determining whether or not to forward a packet; wherein only a single one of the plurality of edge cards is configured to result in the sending of the particular packet from the packet switching device.

In one embodiment, said received MPLS packet and the particular packet are both unicast packets. In one embodiment, the transport source value identifies a particular pseudowire over which the MPLS packet was received by the packet switching device. In one embodiment, the core line card does not include a bridge table. In one embodiment, the core line card is configured to store one or more data structures mapping the bridge identification value to the plurality of edge line cards for use said determining the plurality of edge line cards based on the bridge identification value.

Expressly turning to the figures, FIG. 1 illustrates a packet switching device 100 operating according to one embodiment. As shown, packet switching device 100 includes: line cards 101, 102 configured to send and receive packets with networks 110, 120 (each of which include packet switching devices); communication mechanism(s) 103 configured to communicate packets among line cards 101, 102; and other cards 104, such as, but not limited to, route processing cards, service blades etc. Note, as used herein, a card and a board are synonymous.

As shown, network 110 is communicatively coupled to packet switching device 100 over transport communications mechanisms 115. In one embodiment, packets received by packet switching device 100 from core network 110 include a transport source value identifying over which communications link/transport 115 the packet was received. For example, if a packet was received over a pseudowire, the transport source value would identify that pseudowire. Additionally, in one embodiment, packets received by packet switching device 100 from core network 110 include a bridge identification value identifying a virtual bridge implemented by packet switching device 100 to which the packet is to be directed. Packet switching device 100 will typically advertise the bridge identification value and possibly the transport source value to packet switching devices in network 100 so they know the appropriate values to use. Note, there is an extensible number of ways to include such values in a packet, whether encoded in individual fields or combined in some manner (possibly with other values). An embodiment of packet switching device 100, and in particular line cards 101, 102 will be configured to extract these values identified in a received packet.

In one known prior approach, packets would be received with a transport source value (e.g., identification of a pseudowire), but did not have, nor did a packet format provide for, the inclusion of a bridge identification value. Rather, each receiving core line card would maintain a bridge table by learning addresses and forwarding a received unicast packet to a single edge card for forwarding from the packet switching device. In other words, the receiving core line card maintained a bridge table based on the transport source value and source address of the received packet (e.g., source address within the MPLS encapsulated packet). Thus, typically each packet required bridge learning processing to maintain a separate bridge table for each virtual bridge.

In contrast to the prior approach and in reference to FIG. 1, in one embodiment, packet switching device 100 receives a unicast packet from network 110 on one of line cards 102. This received packet includes both a bridge identification value and a transport source value. Line card 102 maintains, in one or more data structures, a mapping from the bridge identification value to one or more, but typically multiple, line cards associated with the virtual bridge referenced by the bridge identification value. Line card 102 then forwards the received packet (possibly after modifying it) to each of line cards 101 mapped to the bridge identification value. Thus, line cards 102 typically do not maintain a bridge table, or at least do not maintain a bridge table for forwarding packets identifying a bridge identification value.

In one embodiment, each of line cards 101 maintains at least one bridge forwarding table for each virtual bridge for packets associated with customer networks 120. Each of these line cards 101 performs address learning for packets received from customer networks 120. This address learning includes associating the source address of a received packet with an interface of the virtual bridge on which the packet was received, so that a lookup operation on the destination address of a packet traveling in the opposite direction can be performed on this line card (101) to identify the appropriate interface from which to forward the packet. Additionally, the line card (101) on which the packet was received will become the "owner" of this address, and notify the other line cards (101) that it is the owner. The other line cards (101) will update their forwarding data structures to identify they are not the owner/another line card is the owner, and possibly an identification of the owner line card (101). In this manner, when a lookup operation is performed by the "owner" line card 101, the result will identify the interface associated therewith and the packet will be forwarded therefrom. When a lookup operation is performed by one of the other line cards (101), this other line card (101) will identify it is not the owner and drop the packet (thus, only the owner will forward the packet). If a lookup operation in a line card (101) does not locate an entry in its forwarding data structure, the packet is broadcast out all interfaces of the corresponding virtual bridge to try and reach the destination. Further, in one embodiment, the owner line card (101) will age these address/interface associations, and when removing an entry, it will also notify the other line cards (101) so that they will remove the corresponding entry in their respective forwarding data structures. Also, there can only be a single owner for unicast distribution; so if a new owner notifies the previous owner it will mark in its forwarding data structure that it is not the owner/another line card is the owner (and possibly an identification of the current owner). Of course, other ownership, distribution, and aging mechanisms can be used in one embodiment.

Each of multiple line cards 101 that receives a unicast packet performs a lookup operation on bridge table associated with the virtual bridge identified by the bridge identification value to determine whether or not to forward the packet from the packet switching device; and accordingly, typically either forwards the packet from the packet switching device or drops the packet. Additionally, each of multiple line cards 101 that receives the unicast packet (or at least the one that forwards the packet) will perform address learning to maintain (e.g., populate) the bridge table for the virtual bridge identified by the bridge identification value. For example, the bridge table will be updated as needed to associate the transport source value with the source address of the packet (e.g., the source address within an MPLS encapsulated packet).

Thus, one embodiment minimizes processing performed by a line card 102 on a packet received with a bridge identification value by forwarding the packet to all line cards associated with the virtual bridge identified by the bridge identification value. Thus, one embodiment uses a multiple of the bandwidth of communication mechanism(s) 103 than a prior approach which only sends a single packet to the single line card 101 from which the packet will be sent from packet switching device 100 (with this multiplier being the number of line cards 101 sent the unicast packet). Further, one embodiment requires multiple line cards 101 to perform some processing on a unicast packet, even though only one of these line cards will forward the packet from packet switching device 100.

Note, in one embodiment, packet switching device 100 is configured as an "edge" router, connecting customer network(s) 120 with core network 110. Thus, line cards 101 are referred to as edge line cards; and line cards are referred to as core line cards 102. In one embodiment, core network 110 uses label switching technology (e.g., Multiprotocol Label Switching) to communicate packets between edge routers, including edge router 100. In one embodiment, packets are received on line cards 102 over pseudowires 115 from a packet switching device in core network 110.

Figure 2:
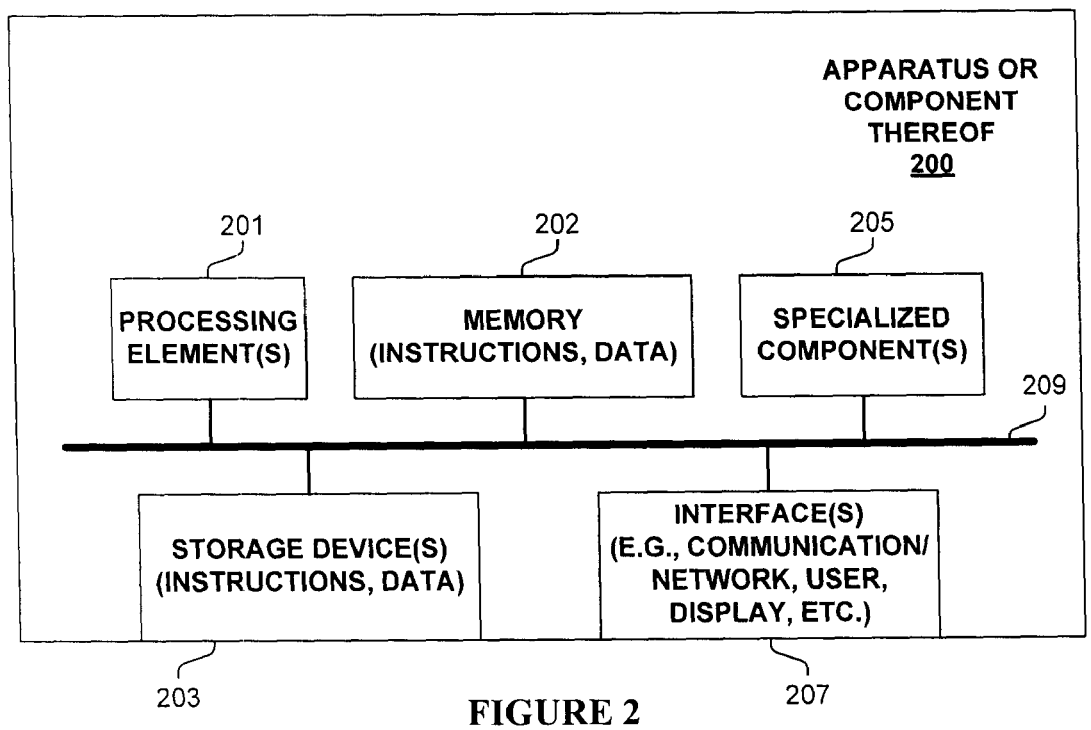
FIG. 2 illustrates an apparatus or component used in one embodiment.

FIG. 2 is block diagram of an apparatus or component 200 used in one embodiment associated with distributing packets to line cards of a packet switching device based on bridge indication values received therewith. In one embodiment, apparatus or component 200 performs one or more processes corresponding to one of the flow diagrams illustrated or otherwise described herein.

In one embodiment, apparatus or component 200 includes one or more processing element(s) 201, memory 202, storage device(s) 203, specialized component(s) 205 (e.g. optimized hardware such as for performing lookup or other operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, packet switching device 101 (possibly that of a line card 101 or 102) of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
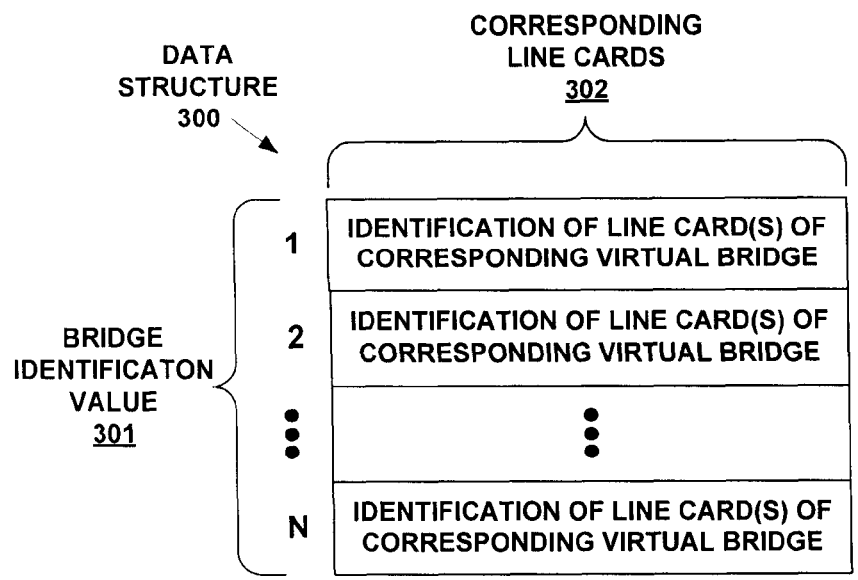
FIG. 3 illustrates a data structure used in one embodiment.

FIG. 3 illustrates a data structure 300 used in one embodiment for identifying line cards of a virtual bridge (listed or otherwise encoded in elements 302) corresponding to a corresponding bridge identification value 301. As shown, one embodiment uses a simple array data structure 300. One embodiment uses a different data structure, as there are an extensible number of different ways of implementing data structure 300 to maintain a mapping between a bridge identification value (301) and one or more line cards (identified in elements 302). Typically, these one or more line cards are not all of the line cards; thus, a received packet is not sent to all line cards, but only those specified in corresponding element 302.

Figure 4:
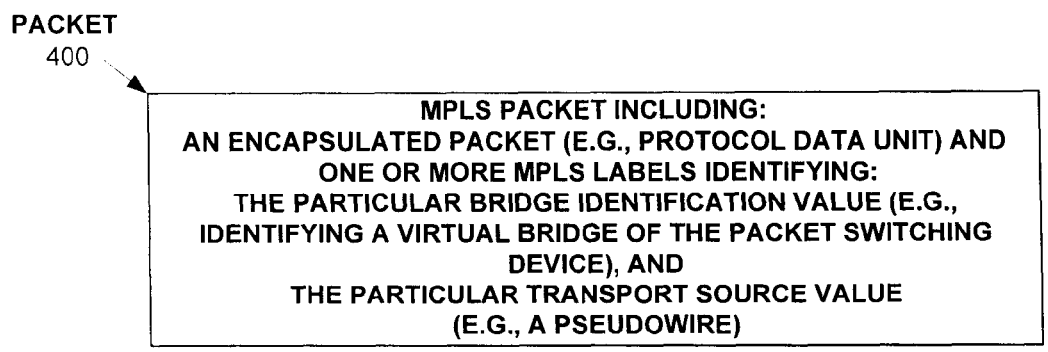
FIG. 4 illustrates a packet used in one embodiment.

FIG. 4 illustrates a packet 400 used in one embodiment. In one embodiment, packet 400 is an MPLS packet, including: an encapsulated packet (e.g., the Protocol Data Unit of the original packet encode as an MPLS packet by another edge router); and one or more MPLS labels identifying a particular bridge identification value and a particular transport source value (e.g., which pseudowire the packet is being received over). In one embodiment, the particular bridge identification value is encoded in a first MPLS label, and the particular transport source values is encoded in a second MPLS label. In one embodiment, the particular bridge identification value and the particular transport source values are encoded in a single MPLS label.

Figure 5:
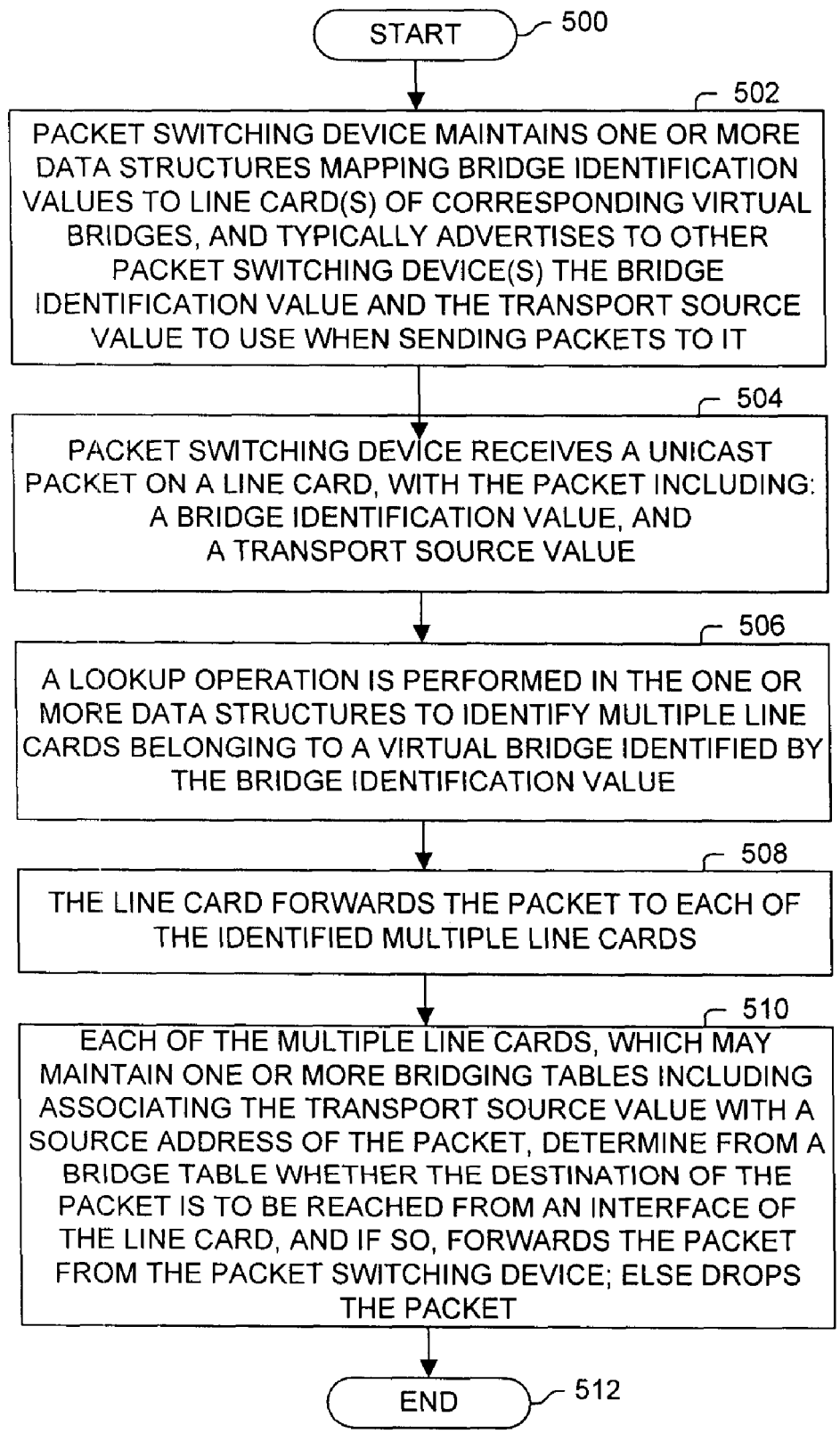
FIG. 5 illustrates a process performed in one embodiment.

FIG. 5 illustrates a process performed in one embodiment. Processing begins with process block 500. In process block 502, the packet switching device maintains one or more data structures mapping map bridge identification values to line card(s) of corresponding virtual bridges. Typically, the packet switching device advertises to a directly communicatively coupled packet switching device (and possibly other packet switching devices) the bridge identification value and the transport source value to use for sending packets associated with the corresponding virtual bridge and method of transport.

In process block 504, the packet switching device receives a unicast packet on a line card, with the packet including a bridge identification value and a transport source value. In process block 506, a lookup operation is performed on one or more data structures to identify multiple line cards (typically customer facing line cards) belonging to the virtual bridge identified by the bridge identification value. In process block 508, the line card forwards the packet to each of the identified line cards. In process block 510, each of the multiple line cards determines from a maintained bridge table whether or not the destination of the packet is to be reached from one of its interfaces; and if so, forwards the packet from the packet switching device; else drops the packet. In maintaining its bridge table(s), at least the line card forwarding the packet typically updates a bridge table based on the transport source value and the source address of the packet. Processing of the flow diagram of FIG. 5 is complete as indicated by process block 512.

Figure 6:
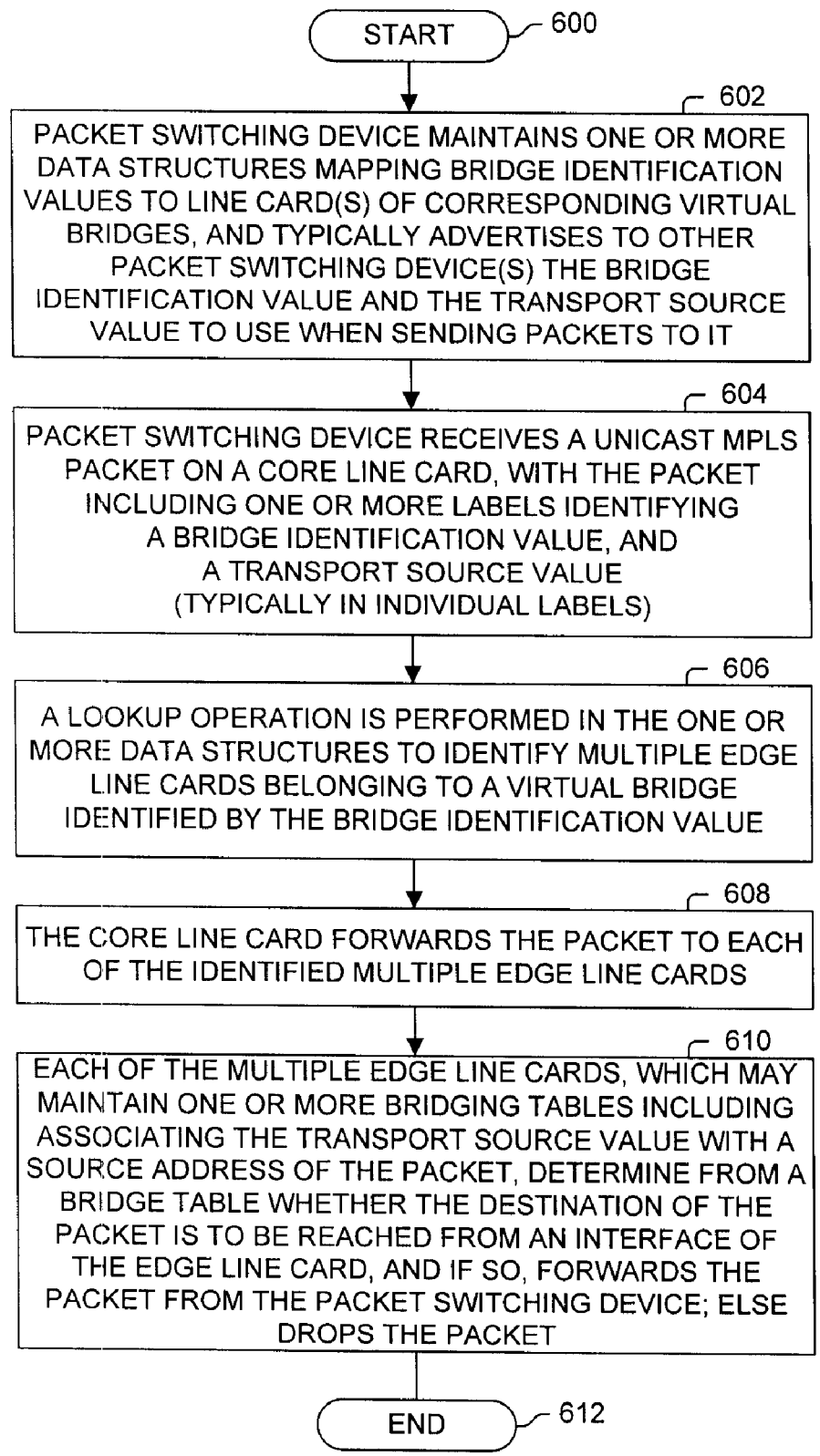
FIG. 6 illustrates a process performed in one embodiment.

FIG. 6 illustrates a process performed in one embodiment. Processing begins with process block 600. In process block 602, the packet switching device maintains one or more data structures mapping map bridge identification values to line card(s) of corresponding virtual bridges. Typically, the packet switching device advertises to a directly communicatively coupled packet switching device (and possibly other packet switching devices) the bridge identification value and the transport source value to use for sending packets associated with the corresponding virtual bridge and method of transport.

In process block 604, the packet switching device receives a unicast MPLS packet on a core line card, with the packet including one or more labels identifying a bridge identification value and a transport source value. Typically, these values are encoded in separate labels. In process block 606, a lookup operation is performed on one or more data structures to identify multiple edge line cards (e.g., customer facing line cards) belonging to the virtual bridge identified by the bridge identification value. In process block 608, the core line card forwards the packet to each of the identified edge line cards. In process block 610, each of the multiple edge line cards determines from a maintained bridge table whether or not the destination of the packet is to be reached from one of its interfaces; and if so, that edge line card forwards the packet from the packet switching device; else drops the packet. In maintaining its bridge table(s), at least the edge line card forwarding the packet typically updates a bridge table based on the transport source value and the source address of the packet. Processing of the flow diagram of FIG. 6 is complete as indicated by process block 612.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A packet switching device, comprising:
a plurality of first line cards;
a second line card, communicatively coupled to the plurality of first line cards, with the second line card configured:
to receive a particular packet including one or more values identifying the bridge identification value, wherein the bridge identification value corresponds to a particular virtual bridge of a plurality of virtual bridges;
to identify the plurality of first line cards based on said identified bridge identification value; and
to forward said received particular packet, as received or a derivation thereof, to said identified plurality of first line cards;
wherein the packet switching device is configured such that only a single one of said identified plurality of first line cards will send a packet from the packet switching device corresponding to said received particular packet, as received or the derivation thereof.

2. The packet switching device of claim 1, wherein said received particular packet and said sent packet are both unicast packets.

3. The packet switching device of claim 1, wherein the second line card does not include a bridge table.

4. The packet switching device of claim 3, wherein said received particular packet includes one or more values identifying a transport source value identifying a transport source of said received particular packet; and wherein each of the plurality of first line cards is configured to perform address learning for populating respective one or more bridge tables, with said populating including for at least said single one of the plurality of first line cards: associating the transport source value with a source address of the particular packet.

5. The packet switching device of claim 4, wherein each of the plurality of first line cards is configured to determine whether or not to send the packet corresponding to said received particular packet, as received or the derivation thereof, from the packet switching device based on a lookup operation in said respective one or more bridge tables.

6. The packet switching device of claim 1, wherein the second line card is configured to store one or more data structures mapping the bridge identification value to the plurality of first line cards; and wherein said identifying the plurality of first line cards based on said identified bridge identification value includes performing a lookup operation on said one or more data structures.

7. A method, comprising:
receiving a particular packet on a first line card of a plurality of line cards of a packet switching device, with said received particular packet including: one or more values identifying a particular bridge value of a plurality of bridge values;
forwarding said received particular packet, as received or a derivation thereof, from the first line card to at least two of the plurality of line cards to which the particular bridge value is mapped; and
sending, from the packet switching device, a packet corresponding to said received particular packet, as received or the derivation thereof, only from a single line card of said at least two of the plurality of line cards.

8. The method of claim 7, wherein the bridge identification value corresponds to a particular virtual bridge of a plurality of virtual bridges.

9. The method of claim 7, comprising: maintaining one or more data structures mapping each bridge identification value of the plurality of bridge identification values respectively to two or more of the plurality of line cards of the packet switching device.

10. The method of claim 7, wherein said packet sent from the packet switching device does not include a representation of the particular bridge value.

11. The method of claim 7, wherein said received particular packet and said sent packet are both unicast packets.

12. The method of claim 11, wherein said received particular packet includes one or more particular values identifying a particular transport source value identifying a transport source of said received particular packet; wherein each of said at least two of the plurality of line cards is configured to perform address learning for populating respective one or more bridge tables, with said populating including for at least said single line card: associating the transport source value with a source address of said received particular packet.

13. The method of claim 12, wherein said one or more values identifying the particular transport source value and said one or more particular values identifying the particular bridge value include one or more Multiprotocol Label Switching (MPLS) labels.

14. The method of claim 13, wherein said one or more MPLS labels include: a first MPLS label representing the particular bridge value, and a second MPLS label representing the particular transport source value.

15. The method of claim 14, wherein the particular transport source value identifies a particular pseudowire over which packets can be received by the packet switching device.

16. The method of claim 15, comprising: advertising to another packet switching device to include the first MPLS label and the second MPLS label in packets being sent, over the particular pseudowire, to a particular virtual bridge corresponding to the particular bridge value.

17. The method of claim 12, comprising: performing, by each of said at least two of the plurality of line cards, address learning to build a respective bridge table for use in forwarding packets, wherein said address learning includes associating the particular transport source value with a source address of said received particular packet.

18. The method of claim 17, wherein the first line card is not configured to perform address learning for the particular packet.

19. The method of claim 7, comprising performing, by each of said at least two of the plurality of line cards: learning to build a respective bridge table; and performing a lookup operation on a destination address of said received particular packet in the respective bridge table to determine whether to send said packet corresponding to said received particular packet, as received or the derivation thereof, or to drop the particular packet, as received or the derivation thereof.

20. The method of claim 19, wherein the first line card is not configured to perform address learning for the particular packet.

21. A packet switching device, comprising:
a plurality of edge line cards;
a core line card, communicatively coupled to the plurality of edge line cards, with the core line card configured:
to receive a Multiprotocol Label Switching (MPLS) packet including: a first label identifying a bridge identification value, and a second label identifying a transport source value; wherein the MPLS packet encapsulates a particular packet;
to determine the plurality of edge line cards based on the bridge identification value; and
to forward the particular packet and the transport source value to said determined plurality of edge line cards; and
wherein each of the plurality of edge line cards is configured: to perform address learning for a respective one or more bridge tables, which includes associating the transport source value with a source address of the particular packet; and to perform lookup operations on the respective one or more bridge tables for determining whether or not to forward a packet; wherein only a single one of the plurality of edge cards is configured to result in the sending of the particular packet from the packet switching device.

22. The packet switching device of claim 21, wherein said received MPLS packet and the particular packet are both unicast packets.

23. The packet switching device of claim 22, wherein the transport source value identifies a particular pseudowire over which the MPLS packet was received by the packet switching device.

24. The packet switching device of claim 22, wherein the core line card does not include a bridge table.

25. The packet switching device of claim 22, wherein the core line card is configured to store one or more data structures mapping the bridge identification value to the plurality of edge line cards for use said determining the plurality of edge line cards based on the bridge identification value.

* * * * *